United States Patent [19]

Hengel

[11] 4,345,902
[45] Aug. 24, 1982

[54] SIMPLIFIED PHONICS IN THE SEQUENTIAL STEPS TO READING

[76] Inventor: Jean V. Hengel, One Vernon La., Malvern, Pa. 19355

[21] Appl. No.: 297,635

[22] Filed: Aug. 31, 1981

Related U.S. Application Data

[63] Continuation-in-part of Ser. No. 153,261, May 27, 1980, abandoned, which is a continuation-in-part of Ser. No. 753,263, Dec. 22, 1976, abandoned.

[51] Int. Cl.$^3$ .............................................. G09B 1/12
[52] U.S. Cl. .................................................. 434/170
[58] Field of Search ................... 35/35 H, 35 R, 35 J, 35/60, 70, 71, 73; 273/152.7 R, 152.7 A; 434/167, 170, 171

[56] References Cited

U.S. PATENT DOCUMENTS

| | | |
|---|---|---|
| 1,343,721 | 6/1920 | Herrmann . |
| 1,384,192 | 7/1921 | Heine . |
| 2,474,447 | 6/1949 | Wheelock . |
| 3,305,945 | 2/1967 | Crawford . |
| 3,654,712 | 4/1972 | Bagdascar . |
| 3,715,812 | 2/1973 | Novak . |
| 3,774,319 | 11/1973 | Sprowls . |
| 4,299,577 | 11/1981 | Marryman ..................... 434/170 |

FOREIGN PATENT DOCUMENTS 578881  6/1933  Fed. Rep. of Germany .

OTHER PUBLICATIONS

Kinesthetic Alphabet No. 107, by Playskool, A Milton Bradley Co., p. 72, of CLED Learning Cat., Feb. 1976.
"Vowel" Definition, Webster's Seventh New Collegiate Dictionary, copyright 1963.
Alphabet Flip Chart, No. 2205-S by Kenworthy, p. 153 of CLEO Learning Cat., Feb. 1976.

*Primary Examiner*—Harland S. Skogquist
*Attorney, Agent, or Firm*—Terence P. Strobaugh

[57] ABSTRACT

An educational device for aiding in the teaching of the mechanics of reading which employs color coded cards using three colors to facilitate teaching and learning the alphabet, the sounds the alphabet letters represent, subsequent word attack skills and necessary sight words.

5 Claims, 5 Drawing Figures

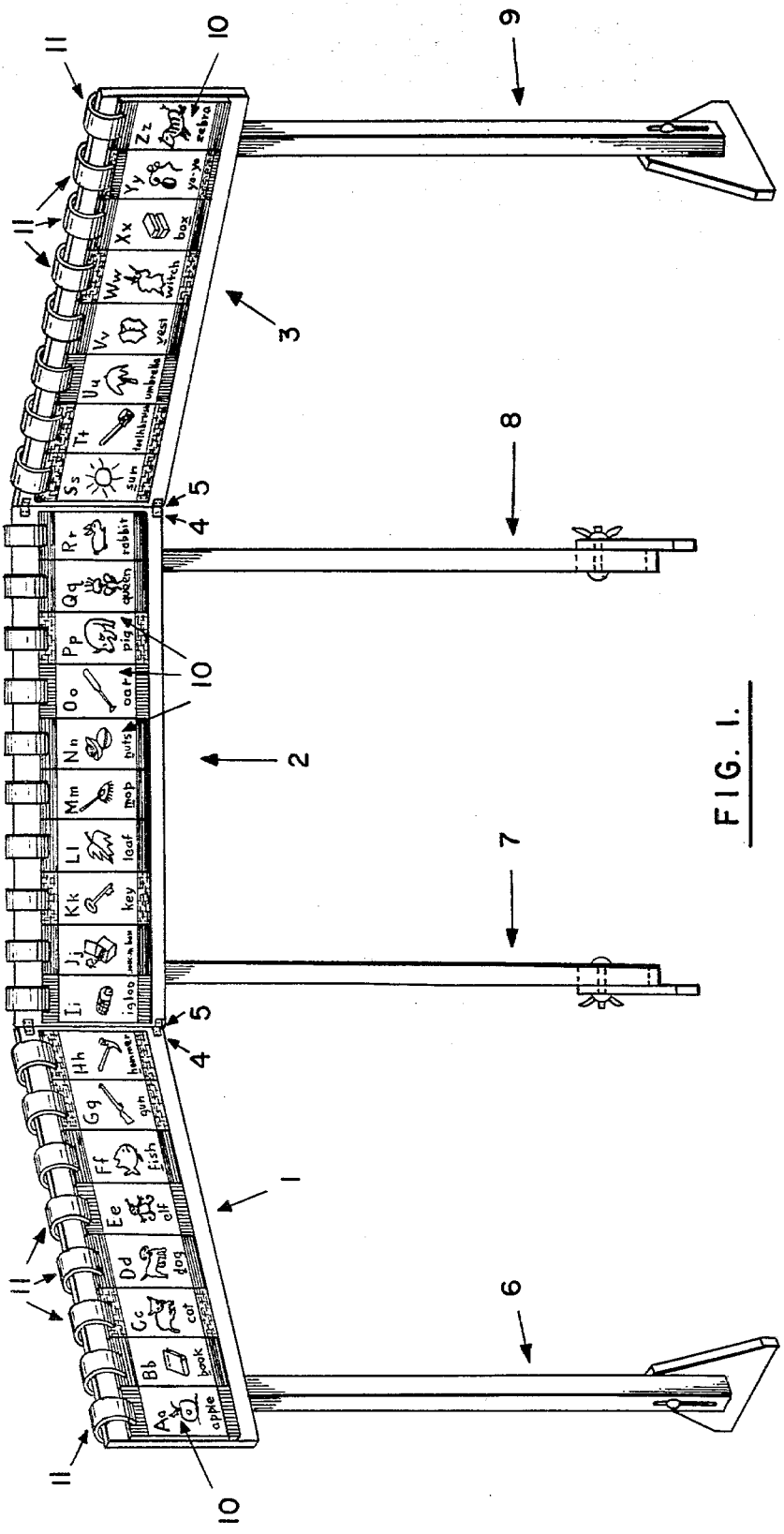
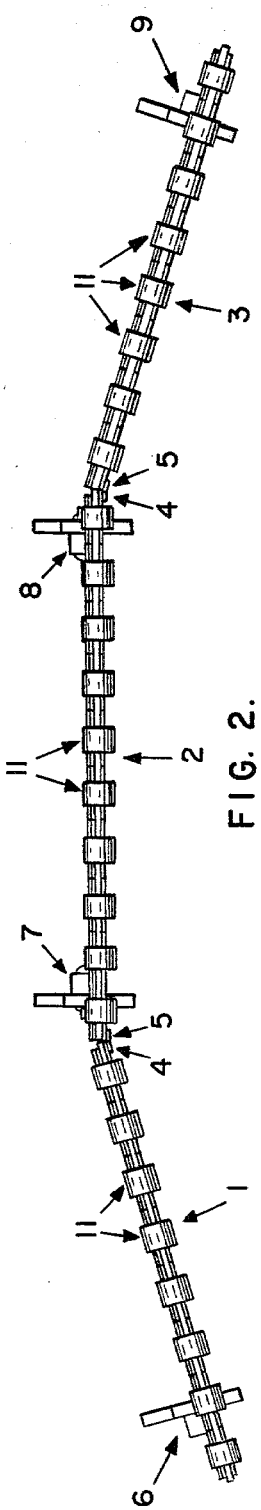
FIG. 1.
FIG. 2.

SIMPLIFIED PHONICS IN THE SEQUENTIAL STEPS TO READING

This is a continuation-in-part of U.S. Ser. No. 153,261 filed May 27, 1980, abandoned which was a continuation-in-part of U.S. Ser. No. 753,263 filed Dec. 22, 1976, now abandoned.

This invention relates to a color coded system and an apparatus displaying said system for imparting the sequential instruction and information for learning how to read the English language through phonics.

The English language is one of the most difficult to learn to read because of the varied sounds of the letters with little, if any, correlation of the letters to the sounds produced. This lack of uniformity of sounds often leads to one learning to read by rote and/or complex rules rather than by a simplified systematic method.

The prior art affords a wide array of attempts to present a systematic presentation of simple words. For example, *Webster's Seventh New Collegiate Dictionary*, G. C. Marriam Co., 1961, pages 15a through 21a, presents a system virtually unusable for those just beginning to learn to read the English language.

Other systems known in the art include U.S. Pat. No. 1,280,930, which discloses a device for forming words; U.S. Pat. No. 3,290,800, which is an alphabet game; U.S. Pat. No. 3,823,492, which discloses a means for teaching sight words; U.S. Pat. No. 3,715,812, which discloses an attempt to clarify the pronunciation of a word by color coding each individual letter of the alphabet, and U.S. Pat. No. 3,774,319, which is an apparatus for teaching handicapped people especially the blind.

Reading, writing and spelling are not three separate and distinct subjects to be taught in isolation. Rather, they are essential and inseparable components of literacy and the foundations for literacy should be laid in the pre-school, first and second year of school.

If English were a hieroglyphic language, it would make sense to use only a whole-word memorization (look-say) method, but English is a predominantly phonetic language and the obvious way to teach it is with phonics.

Phonics, when taught properly, is a method by which children learn to read and spell correctly in the same lessons. They learn to hear the different sounds in the spoken words and learn to write the corresponding letters in proper left-to-right order. In other words, they learn to spell correctly.

Reading and writing should go hand in hand because when taught together, each reinforces the other in the child's mind.

Children learning by the look-say method have, at best, only a hazy motion of why words are pronounced as they are. They have, therefore, only a hazy notion of how words should be spelled.

The present invention provides a novel and easily understood system for teaching phonics comprising a color coded system employing only three different colors, preferably the three primary colors, i.e. bright red, bright blue, and bright yellow (those colors which are most readily distinguished by colorblind students). It contains, on individual cards, a display of letters of the English alphabet, a picture or pictures and word examples of said pictures using the initial sound as the phonic sound being studied. Each letter being marked with said color or colors wherein said color indicates the phonetic characteristics of said letter. The color coding divides the alphabet into four main divisions for ease of teaching basic phonics. The letter-sets of pictures, words, and further sequential letter attributes can be arranged in many fashions; for example, on a triptych type device or a parallelogram shaped device, or any other shape.

DESCRIPTION OF THE INVENTION

FIG. 1 shows a triptych type device on a stand displaying color coded letters with pictures and word examples using the initial sound of each key word as the phonic sound of said letter, with the exception of the letter X when the final sound of the word is used.

FIG. 2 shows a top view.

Figure 3:
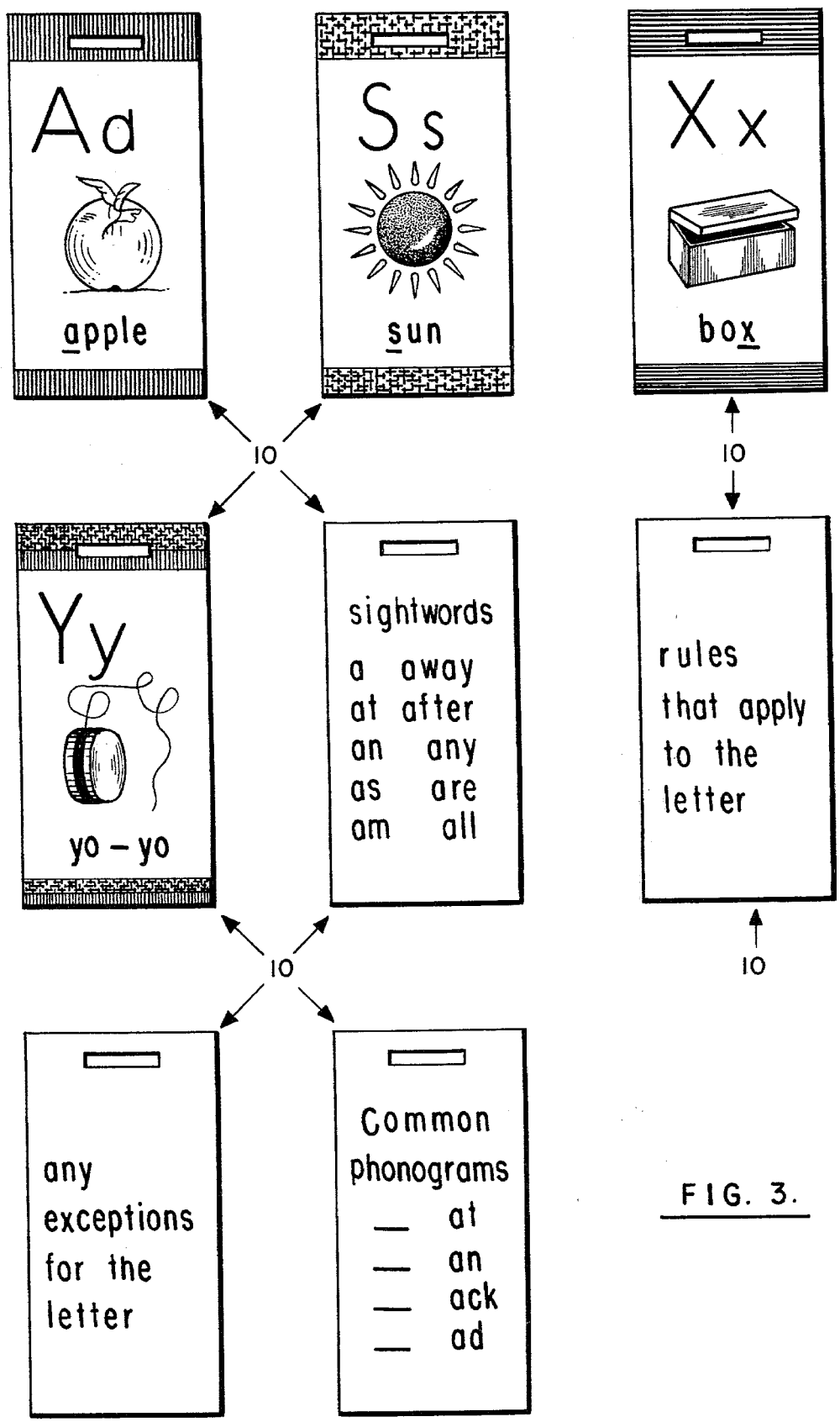
FIG. 3 illustrates some of the types of cards which can be utilized in the letter-sets.

The triptych type device, with stand or as a folding display rack, is comprised of three panels 1, 2, and 3, which can be made of various materials including wood, plastic or metal with hinge 4, 5 fastening one panel to another and having adjustable legs 6, 7, 8, 9, of wood, plastic, or metal. The panels serve as support for cards 10. The cards have an operative or pair of operatives adjacent their upper edges which are in registry with one another and are adapted to receiver rings 11 which are mounted on said panels, perpendicular to said panels to permit cards to be flipped front to back.

The device can be employed without the legs and could be mounted, for example, on a wall or other suitable surface. The devices can be of any size and the size will depend mainly on where the device is to be employed. For example, desk size devices can range in size from about 20 inches to about 52 inches or more in length wherein the card size is from about 1×2 inches to about 2×4 inches with the panels being proportionate in height and width.

A stand is preferred for classroom use in group instruction and is from about 17 inches to about 45 inches high to permit the instructor to sit or stand behind or beside the device and face those being instructed. The panel can be of any height but for normal classroom use, a height in the range of from about 5 inches to about 10 inches or more is satisfactory. Likewise, the length of the panels can vary widely; however, I have found that for storage, transportation and especially presentation, the length of the panels should preferably be in the range of from about 20 inches to about 35 inches.

Figure 4:
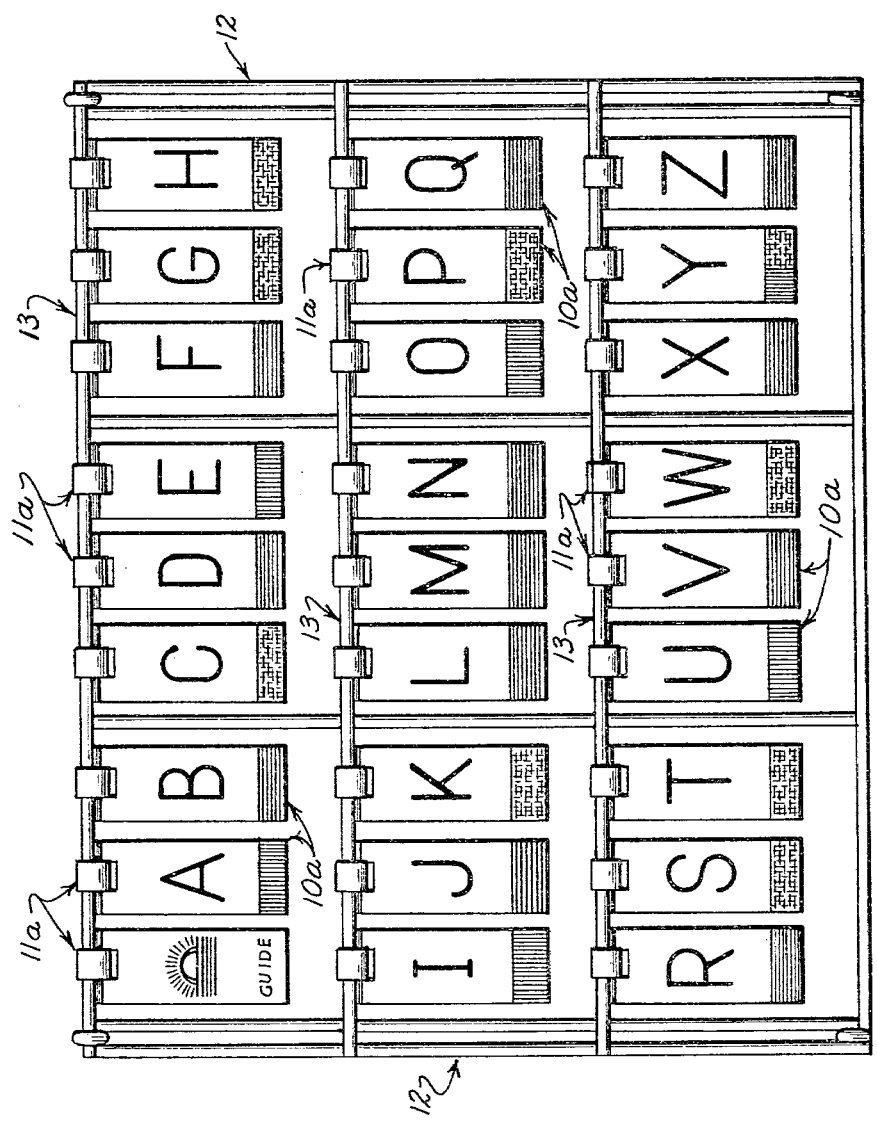

FIG. 4 shows a most convenient size device as one on a collapsible frame 12 having a total height of about 18 inches and a total width of about 20 inches; metal rods 13 having replaced the panels 10 and the rows having been tiered for compactness.

Figure 5:
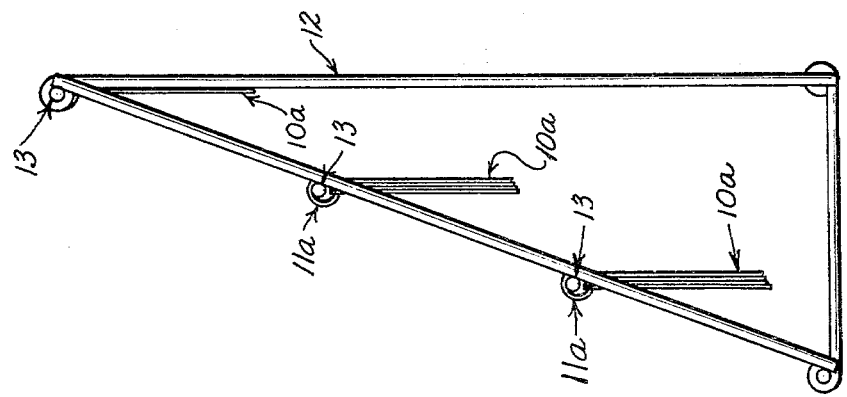

FIG. 5 shows a side view.

In FIGS. 4 and 5, the corresponding parts to FIGS. 1, 2 and 3 have been given the subscript "a."

Each row in FIG. 4 contains nine sets of flip-cards for a total of 27 sets of cards. There is one set of instructions and 26 sets of color coded flip-cards corresponding to the 26 letters of the English alphabet. Each letter-set starts with a card containing a letter of the alphabet and proceeds systematically through that letter's sound or sounds to words and the sequential word attack attributes of that particular letter.

The dimensions of the cards employed on a classroom device can be of any convenient size, but will normally be from about 2 inches to about 5 inches in height and of sufficient width to permit the 27 sets of cards to fit side by side on the three panels or the tiered rods. The size cards which I have found the most convenient are about 2 inches wide and graduated in height in the sets from about 2 inches to about 4 inches.

Each card contains a color code which color can frame B or and or otherwise mark the entire card or portion thereof, but bands at the top and/or bottom of the card are preferred. The color is preferably a primary color either red, yellow or blue as described above. The cards can be printed and can also, for kinesthetic learning, have raised, flocked or sanded surfaces.

The present invention now permits the presentation of phonics and word attack skills in a simplified, visual, logical, unified and sequential manner so that those desiring to learn to read the English language are not bewildered by the numerous sounds and abstract concepts, but can easily grasp through the color coded alphabet the pronunciation of words by the phonetic method.

The sequence of cards in each of the 26 letter-sets contains the capital and lower-case letters, a way to write the letters, the letter symbols as a pair, a picture and word example for the letter and the subsequent word attack attributes that build on each letter.

This invention relates to a color coded device employing three different colors for teaching phonics which comprises a display of the letters of the English alphabet wherein the cards are grouped as follows:

I. The cards containing the consonant letters B, D, F, J, L, M, N, Q, R, V, X and Z, with a picture and word example using the initial sound of each, are color coded with one color, preferably a primary color and more preferably blue, to denote that for the beginning reader each of these letters has a consistent sound.

II. The cards containing the consonant letters C, G, H, K, P, S, T and W with a picture and word example using the initial sound of each are color coded with a second color, preferably another primary color and more preferably yellow to denote that said letters usually have more than one pronunciation including H and K which are sometimes silent. H is a troublesome letter. It represents the sound "huh", as in house, except when it follows the letters C, G, P, S, T or W and then it changes the basic sounds these letters make. The letters C and G have both hard and soft sounds. K has a consistent sound, but is silent when it is followed by N. W is silent when followed by R.

III. The cards containing the vowel letters, A, E, I, O and U with a picture and word example using the sounds represented by the vowels, are color coded with a third color, preferably another primary color, and more preferably red. A, E and I each have four sounds, O has five sounds and U has three sounds.

IV. Lastly, a card containing the letter Y, with a picture and word example using each sound represented by Y, is color coded with two colors, preferably two primary colors and more preferably yellow and red to denote that Y is a consonant that can also act as a vowel and has three sounds. It, therefore, must contain the colors designated to Group II and Group III.

It is to be understood that for Groups I, II and III, the color identifying each must be different from the other.

Use of this device affords not only a means for display, but also affords easy access for both teacher and student and can be manipulated easily by the pupil. Both the triptych design and the tiered rack offer a device which is easily stored and easily handled.

As with all good teaching systems, certain psychological aspects about this device enhance its value. Though the device can be any size, the preferred size mentioned above is primarily for use in teaching preschool, first and second grade youngsters to read. This size device permits the smaller child to actually use the device by flipping the cards thereby making learning to read not only easier, but also more enjoyable. The teacher is constantly maintaining eye contact with the student which increases the concentration of the pupil. The flip cards provide not only the teacher, but more importantly the pupil with a gauge as to what he has learned, what he must learn next and how much farther in the learning-to-read sequence he still must go, thereby helping to maintain interest, show progress, yet not overwhelm the student.

Those skilled in the art will recognize that many varying and different embodiments may be made within the scope of this invention and it is, therefore, understood that the details given herein are illustrative only and not limiting.

What is claimed is:

1. A color coded device employing three different colors for teaching phonics which comprises a display of letters of the English alphabet wherein said display is on cards grouped as follows:
   Group I—B, D, F, J, L, M, N, Q, R, V, X, and Z are coded with one color;
   Group II—C, G, H, K, P, S, T, and W have more than one pronunciation and are color coded with a second color;
   Group III—A, E, I, O, and U are vowels and are color coded with a third color and
   Group IV—Y, a consonant, which can act as a vowel, is color coded with two (2) colors because it has attributes of both Group II and Group III.

2. The device of claim 1 wherein the colors are the three primary colors employed.

3. The device of claim 2 wherein Group I is color coded blue; Group II is color coded yellow; Group III is color coded red, and Group IV is color coded red and yellow.

4. The device of claim 3 wherein said color coded cards also contain a picture or pictures and a word example or word examples illustrating the phonetic sound or sounds of a letter.

5. The device according to claim 4 wherein said cards can be manually flipped from front to back on receiver rings.

* * * * *